June 13, 1967    A. A. DE GAST    3,324,563
CORE ORIENTATION IN BORE HOLE
Filed Feb. 15, 1965
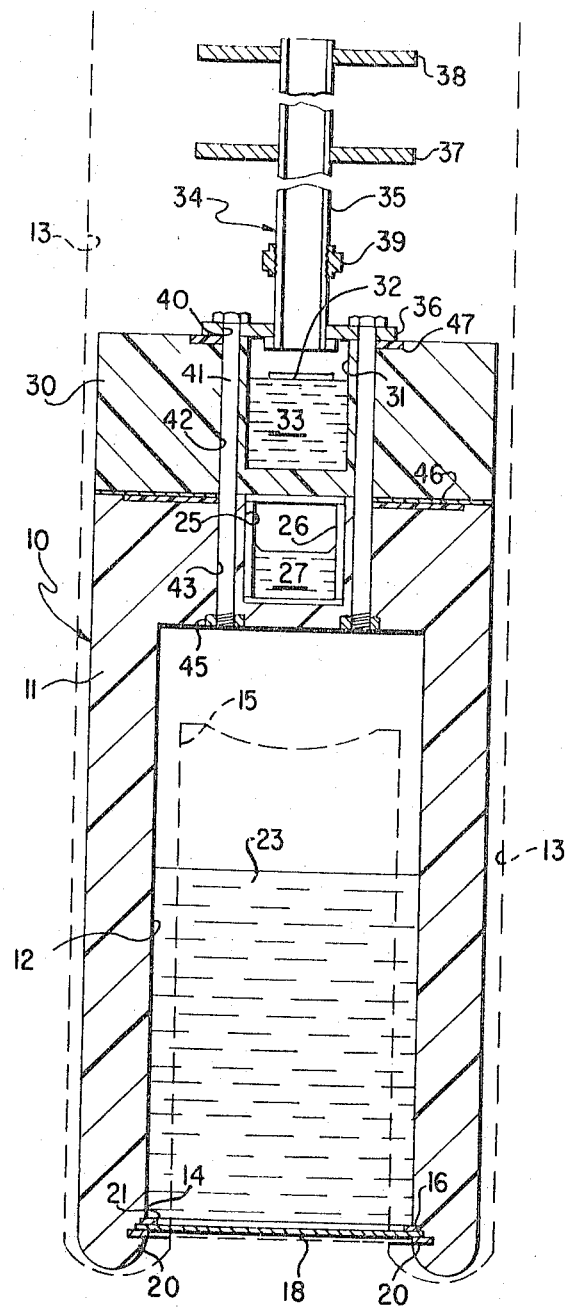

3,324,563
CORE ORIENTATION IN BORE HOLE
Adrian Anton De Gast, Kingston, Ontario, Canada, assignor to C-I-M Consultants Limited, Kingston, Ontario, Canada
Filed Feb. 15, 1965, Ser. No. 432,635
Claims priority, application Canada, Dec. 7, 1964, 918,062
3 Claims. (Cl. 33—205.4)

This invention relates to core analysis and more particularly to a method and apparatus for orienting a rock core removed from a bore hole with a conventional core barrel assembly.

In analyzing a core sample particularly where the core's directional properties are to be taken into consideration, it is important to be able to determine the dip and azimuth of the core, dip being the amount of deviation from vertical due to slanting of the drill hole.

Methods of core orientation include taking either wax or mechanical impressions of the top of a core stub before the core stub is removed from the hole and relating these impressions to compass readings obtained from a compass placed in the wax or in the core barrel.

Another method is that of placing a scratch on the core stub while it is fixed in the bottom of the hole and relating the scrach mark to dip and azimuth measurements obtained from instruments mounted in the core barrel.

The above methods and other variants require that the core be well marked while it is fixed in the bottom of the hole so that the direction of the core, while so fixed, can be established by relating the markings after removal of the core to dip and azimuth readings, taken independently of the core. Furthermore, there is the risk of obscuring the configuration of the top of the core stub by the subsequent drilling required to extract the core. A still further consideration is that the dip and azimuth readings taken from instruments mounted in the core barrel, relate to the attitude of the hole rather than the attitude of the core stub and there may be deviation between the attitudes of the hole and the core stub.

A method has also been devised whereby unmarked core is fed into a core barrel during normal core drilling operations. The dip and azimuth is determined with instruments mounted in the core barrel and in relation to the inner core barrel, which, in turn, is related to the core in the barrel after extraction of the core from the hole. This method requires that the direction of the core with reference to the inner core barrel does not change from the time the core is fixed on the bottom of the hole to the time when the core is on surface and marked with relation to the inner core barrel.

It is a feature of the present invention to provide a method and apparatus by which the orientation instruments are secured to the core stub while the core stub is attached to the rock at the bottom of the bore hole, the core and the instruments secured thereto being subsequently removed.

Accordingly, the present invention provides a method for orienting a rock core removed from a bore hole comprising the steps of: providing a core stub at the bottom of said bore hole; lowering an orientation indicating instrument down said bore hole; securing said instrument to said core stub and removing said core stub and attached instrument from said bore hole.

Furthermore, the present invention provides an apparatus for indicating the orientation of a rock core removed from a bore hole in a rock formation, said apparatus comprising: a housing, a recess in said housing adapted to receive a core stub, a frangible plate covering the mouth of said recess and means for securing an orientation indicating instrument to said housing, said recess being adapted to be filled with cement which is retained therein by said frangible plate, whereby lowering said housing onto said core stub causes said plate to be ruptured and said cement bonds said housing and said instrument secured thereto to said core stub which is subsequently removed.

The drawing which illustrates a preferred embodiment of the present invention is a sectional side elevational view of the apparatus ready for use, showing in addition the bore hole and core stub in broken lines.

Referring now in detail to the accompanying drawing, the apparatus indicated generally by numeral 10 includes a cylindrical lower housing portion 11, preferably of rigid plastic material, or other suitable non-magnetic material so dimensioned as to be received in a bore hole 13 shown in broken lines. The housing portion 11 is provided with a recess 12 having a lower open end 14 into which a core stub 15 (shown in broken lines) is adapted to extend. A peripheral groove 16 in the internal wall of the recess 12 adjacent the open end thereof, is adapted to receive a circular frangible plate 18 of suitable material such as, for example, single diamond glass, plastic film or aluminum foil. Pins 20 retain the plate 18 in the opening 13 and a sealing gasket 21 of suitable material such as plastic or cork is provided between the plate 18 and the housing 11. The open end 14 is thus sealed to retain viscous adhesive or cement 23 within the recess 12.

The cement 23 may be of any suitable type which does not set for approximately one to two hours, thus allowing time for the apparatus 10 to be lowered down the bore hole 13. The following types of adhesives are given by way of example: epoxy resin, plastic cement supplied by the Cyanamid Company under the trade name AMA and a formaldehyde resin glue supplied by the United States Plywood Corp. under the trademark Weldwood. A container of Dry Ice placed within the recess 12 could be used to retard the setting of the cement 23.

The upper end of the housing portion 11 has a centrally located cavity 25 to receive a level or dip indicator 26; in this case, a glass container partially filled with hydrofluoric acid 27.

An upper housing portion 30 is adapted to be superimposed on the lower portion 11. The upper portion 30 has a centrally located cavity 31 therein to receive an azimuth indicator; in this case, a compass 32 filled with a liquid 33 capable of solidifying to provide a fixed compass reading. For example, the liquid 33 may comprise an epoxy resin which sets in approximately one to two hours.

An assembly 34 is provided to suspend the upper and lower housing portions 11 and 30 from a core barrel (not shown). The assembly 34 comprises a stem 37 of non-magnetic material, preferably copper tubing to which three disks 36, 37 and 38 of non-magnetic material such as aluminum are secured. The stem 35 is preferably fabricated in two sections and joined by a union 39 of non-magnetic metal threadedly received thereon.

The lowermost disk 36 is adapted to cover the cavity 31 and is provided with a plurality of apertures 40 through which connecting bolts of brass or other non-magnetic material extend. The bolts 41 also extend through aligned holes in the upper and lower housing sections 11 and 30 and are provided with nuts 45 threadedly received on their lower ends.

The upper and lower housing sections and the assembly 34 are thus secured together, sealing gaskets 46 and 47 being provided therebetween to prevent the admission of drill mud into the cavities 25 and 31 respectively.

The disk 37 is dimensioned so as to be engaged by the core catcher (not shown) to prevent withdrawal of the assembly 34 from the core barrel. The disk 38 is of the same diameter as the disk 37 and provides for axial alignment of the stem 35 within the core barrel.

Initially a stub of core is drilled at the bottom of the hole with a coring bit but without a core catcher, such that the core would not be broken from the bottom of the hole when the core bit is withdrawn. Fines and cuttings are then thoroughly cleaned from the bottom of the hole by circulation of the drill fluid. The drill column is then withdrawn from the hole.

Just before the apparatus 10 is to be lowered down the bore hole, the dip indicator 26 is placed in the cavity 25 and the housing portion 30 including the seal 46 is placed on the housing portion 11. The azimuth indicator 32 is then placed in the cavity 31 and the gasket 47 and the disk 36 and attached portion of the stem 35 positioned thereon. When the bolts 41 have been inserted and tightened, the apparatus 10 is inverted and the recess 12 is filled with cement 23. The opening 14 is then sealed by means of the frangible plate 18, the gasket 21 and pins 20.

For ease in suspending the apparatus 10 in the core barrel (not shown) the portion of the stem 35 including disks 37 and 38 is first inserted therein and the remaining portion of the stem 35, to which the housing portions are now secured, is thus connected thereto by means of the union 39.

The core barrel is now equipped with a core catcher and the apparatus 10 lowered down the bore holes 13 until it engages the core stub 15 at the bottom of the hole. The bit is then lowered to engage the upper housing portion 30 and force the lower portion 11 over the stub 15 thus rupturing the frangible plate 18. The cement 23 is forced up through the clearance between the recess 12 in the apparatus 10 and the core stud 15.

When the apparatus 10 is in position as determined from markings on the drill column, the bit (not shown) is raised to a position approximately five feet above the core 15 to prevent adverse magnetic influence on the compass 32. The apparatus 10 is permitted to remain in position for a sufficient period of time to allow the cement 23 to set thereby bonding the apparatus 10 to the core stub 15. In addition, sufficient time must elapse to allow the liquid 33 in the compass 32 to solidify and to allow the hydrofluoric acid to etch the glass container of the dip indicator 26.

Subsequently, the bit is lowered and the apparatus 10 and core stub 15 is cored out with an additional length of core; the length of additional core being determined by the length of core barrel in use.

Upon completion of drilling, the core is broken away from the bottom of the bore hole 13 and grasped by the core catcher. The drill column is then withdrawn from the hole.

When the core barrel has reached the surface, the core and the apparatus 10 and instruments 26 and 32 secured thereto, are removed from the core barrel as a unit.

The azimuth from the compass needle, and the dip from the each in the hydrofluoric acid tube is related directly to the core. As the core was fixed in position at the bottom of the hole while the compass was fixed and the etching commenced, it can be established what the altitude of the core was when fixed in the parent rock formation.

It will be appreciated that the means to indicate the dip or deviation of the bore hole need not comprise a glass container filled with hydrofluoric acid. It would also be possible to use a cement or gelatin which when set in the container, would indicate the dip. Furthermore, the azimuth indicator need not comprise a compass filled with liquid capable of solidifying.

I claim:

1. An apparatus for indicating the orientation of a rock core removed from a bore hole in a rock formation, said apparatus comprising:
    (a) a housing formed of non-magnetable material,
    (b) an azimuth indicator disposed within said housing,
    (c) a dip indicator disposed within the housing,
    (d) a bore extending into the lower portion of said housing,
    (e) liquid settable material within said bore, and
    (f) a frangible plate across the access to said bore, whereby when said apparatus is lowered into a bore hole containing a rock core;
        (I) said rock core ruptures said frangible plate,
        (II) said settable liquid secures said rock core to said bore (d),
        (III) said azimuth indicator (b) is fixed at the azimuth of said rock core, and
        (IV) said dip indicator is fixed at the dip of said rock core to provide a unitary core sample having both the azimuth and dip readings permanently secured thereto.

2. An apparatus as claimed in claim 1 wherein said dip indicator comprises a liquid filled container adapted to provide a permanent indication of the angular relationship of said core stub when said core stub was part of said rock formation.

3. An apparatus as claimed in claim 1 for use in orienting a core sample from a non-magnetic rock formation, wherein said azimuth indicator comprises a compass adapted to provide a permanent reading whereby the azimuth of said core stub when said core stub was part of said rock formation, can be determined.

References Cited

UNITED STATES PATENTS

| | | | |
|---|---|---|---|
| 1,954,115 | 4/1934 | Allen | 33—205.4 |
| 2,880,969 | 4/1959 | Williams | 175—226 |

LEONARD FORMAN, *Primary Examiner.*

W. D. MARTIN, WILLIAM K. QUARLES,
*Assistant Examiners.*